(12) United States Patent
Sharma et al.

(10) Patent No.: US 7,047,475 B2
(45) Date of Patent: May 16, 2006

(54) CRC ENCODING SCHEME FOR CONVEYING STATUS INFORMATION

(75) Inventors: Debendra Das Sharma, Santa Clara, CA (US); Ramasubramanian Rajamani, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 10/357,975

(22) Filed: Feb. 4, 2003

(65) Prior Publication Data
US 2004/0153952 A1    Aug. 5, 2004

(51) Int. Cl.
*H03M 13/00* (2006.01)
(52) U.S. Cl. .................................................. 714/758
(58) Field of Classification Search ................. 704/758
See application file for complete search history.

(56) References Cited
U.S. PATENT DOCUMENTS
5,870,413 A    2/1999  Kodama et al.
5,917,837 A    6/1999  Stein
6,049,903 A    4/2000  Nishimura
6,094,465 A    7/2000  Stein et al.
6,148,422 A *  11/2000 Strawczynski et al. ..... 714/704
6,230,124 B1   5/2001  Maeda
6,427,219 B1   7/2002  Yang
6,453,440 B1 * 9/2002  Cypher ....................... 714/758
6,601,210 B1 * 7/2003  Kagan ........................ 714/758
6,684,363 B1 * 1/2004  Cassiday et al. ............ 714/776

* cited by examiner

*Primary Examiner*—Shelly Chase (57) ABSTRACT

A sending node of a networked system includes an encoding module configured to receive a series of data groups with each data group comprising a data block comprising data bits, and control/status bits including at least one error status bit having a state indicative of a presence or absence of at least one type of data block error. The sending node is configured to generate for at least one of the data groups of the series an expected cyclic redundancy code (CRC) comprising a plurality of bits that is a function of the data block and control/status bits, not including the at least one error status bit. The sending node is further configured to encode the expected CRC with the state of the at least one error status bit to thereby generate for the at least one data group an encoded CRC comprising a plurality of bits.

44 Claims, 6 Drawing Sheets

CRC ENCODING SCHEME FOR CONVEYING STATUS INFORMATION

THE FIELD OF THE INVENTION

The present invention relates generally to data communication systems, and more particularly to networked systems transmitting data between distributed nodes and employing error notification and detection techniques to provide notification of whether transmitted data is corrupt or is received free of transmission errors.

BACKGROUND OF THE INVENTION

Networked systems generally transmit data between distributed nodes via some form of network connection, which typically comprises some form of physical link. Transmitted data is normally organized into units of data known as packets, with each packet typically consisting of smaller data units known as flits. Each flit, in-turn, generally comprises a data block, control/status bits (such as credits), and cyclic redundancy code (CRC) comprising a plurality of bits. CRC's are utilized by networked systems for transmission error detection. A sending node employs a logical function to calculate the CRC from the data block, and includes the CRC along with the data block and control/status bits to form the flit for transmission. Upon receiving the transmitted flit, a receiving node employs the logical function to calculate a CRC from the received data block. The calculated CRC not matching the transmitted CRC indicates that a link error occurred during transmission, and in response, a networked system typically initiates a link-layer "retry" mechanism to retransmit data from the sending node to the receiving node, beginning with the flit containing the transmission error.

CRC bits, however, generally notify a receiving node only of data block errors introduced during transmission via the network connection and do not provide notification of data block errors existing prior to transmission. In these situations, networked systems generally include error information as part of a flit to notify a receiving node that the transmitted data block itself contains erroneous information. For example, a sending node retrieving data from a memory source may detect a presence of an uncorrectable data error in the data retrieved from the memory. If the sending node simply transmits the corrupted data to the receiving node and no link errors occur during transmission, the transmitted data appears to the receiving node to be error-free data. To alert the receiving node that the transmitted data itself is corrupt, an error status bit is often included as one of the control/status bits of the transmitted flit. This error status bit is sometimes referred to as the "poison" bit. When a receiving node receives a flit with a "poison" bit indicating corrupted data, the receiving node is notified that the data block is corrupt even though the CRC indicates that the flit was received free from errors during transmission.

While a "poison" bit and other data status bits are effective at notifying a receiving node of a presence of corrupt data and other data abnormalities, they require a flit to either contain more bits or to dedicate fewer bits to other functions, including data transfer. Furthermore, when the errors for which they serve as notification are rarely occurring errors, such as corrupt source data described by the example above, the error and status bits often represent an inefficient use of limited bit capacity.

Since most networked systems typically already dedicate a number of bits of each flit for detection of transmission errors, which account for a large majority of data errors, it would be beneficial if these bits could also be used to notify a destination node of corrupt or source data. The bits formerly dedicated for use as control/status bits, including poison bits, could then be used to increase data transfer capacity or as additional CRC bits to improve detection and/or correction of link errors occurring during transmission. Many systems, particularly those having bandwidth constraints, would benefit from an error detection system not requiring dedicated bits to provide notification of rarely occurring data errors.

SUMMARY OF THE INVENTION

One aspect of the present invention provides a method of communicating data. The method includes generating an expected cyclic redundancy code (CRC) for at least one data group of a series of data groups, wherein each data group comprises a data block and control/status bits including at least one error status bit having a state indicative of a presence or absence of at least one type of data block error. The expected CRC is a function of the data group and control/status bits not including the at least one error status bit. The method further includes encoding the expected CRC with the state of the at least one error status bit to generate an encoded CRC.

One aspect of the present invention provides a sending node of a networked system. The sending node includes an encoding module configured to receive a series of data groups with each data group comprising a data block comprising data bits, and control/status bits including at least one error status bit having a state indicative of a presence or absence of at least one type of data block error. The sending node is configured to generate for at least one of the data groups of the series an expected cyclic redundancy code (CRC) comprising a plurality of bits that is a function of the data block and control/status bits, not including the at least one error status bit. The sending node is further configured to encode the expected CRC with the state of the at least one error status bit to thereby generate for the at least one data group an encoded CRC comprising a plurality of bits.

One aspect of the present invention provides a receiving node of a networked system. The receiving node includes a decoder, which further includes a CRC generator and a comparator. The CRC generator is configured to receive a series of transmission flits with each flit comprising an encoded CRC having M bits and a data group including a data block and control/status bits. The CRC generator is further configured to generate for at least one transmission flit an expected CRC comprising M bits, with each bit having a state, in M bit positions that is a function the data group of the at least one transmission flit. The comparator is configured to compare the encoded CRC to the expected CRC for the at least one transmission flit and to at least one specially designated CRC to thereby provide indication of whether a transmission error is present in the at least one transmission flit and whether the data block of the at least one transmission flit contains corrupt data.

One aspect of the present invention provides a networked system comprising a networked connection, a sending node coupled to the networked connection, and a receiving node coupled to the networked connection. The sending node comprises an encoding module configured to receive a series of data groups with each data group comprising a data block comprising data bits, and control/status bits including at least one error status bit having a state indicative of a presence or absence of at least one type of data block error.

The sending node is configured to generate for at least one of the data groups of the series an expected cyclic redundancy code (CRC) that is a function of the data block and control/status bits, not including the at least one error status bit. The sending node is further configured to encode the expected CRC with the state of the at least one error status bit to thereby generate for the at least one data group an encoded CRC comprising a plurality of bits.

The receiving node comprises a decoder is configured to receive from the sending node the at least one data group, not including the at least one error status bit and the encoded CRC for the at least one data group. The decoder further includes a CRC generator. The CRC generator is configured to generate for the at least one data group an expected CRC that is a function of the at least one data group, not including the at least one error status bit. The comparator configured to compare the encoded CRC to the expected CRC and to at least one specially designated CRC to thereby provide indication of whether a transmission error is present in the at least one data group and encoded CRC and whether the data block contains corrupt data.

DETAILED DESCRIPTION OF THE PREFERRED EMBODIMENTS

Figure 1:
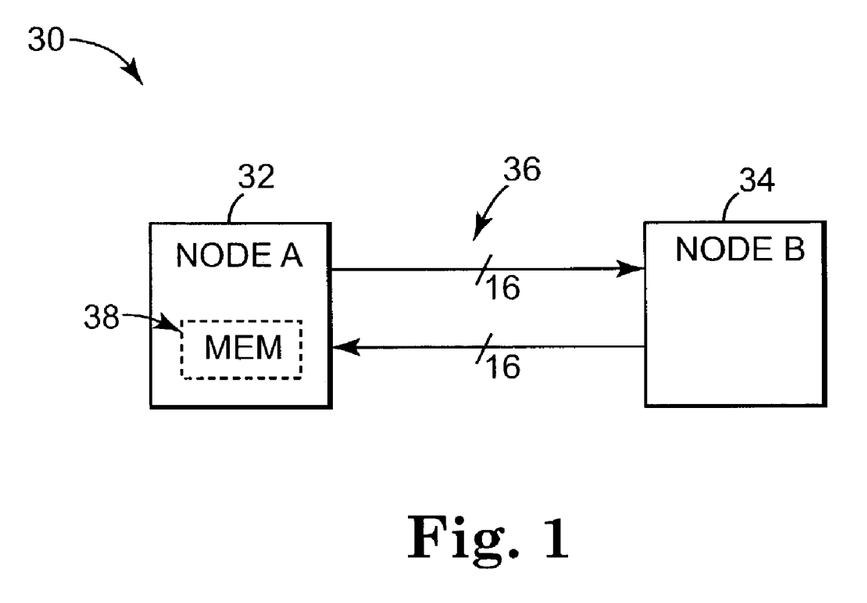
FIG. 1 is a block diagram of a networked system.

A networked system is illustrated generally at 30 in block diagram form in FIG. 1. Networked system 30 includes a node A indicated at 32 and a node B indicated at 34. Networked system 30 has the implicit ability to communicate data between node A, 32, and node B, 34, via an interconnect structure, or interconnect link, 36. Interconnect links, however, are often noisy and can introduce "link" errors to the data during its transmission between nodes, such as between nodes A and B. Link errors occurring during transmission are caused by things such as noise, alpha particle hits, and vibrations, and account for a significant portion of errors in networked systems.

In response to such errors, networked systems typically employ some form of error detection scheme to allow a receiving node, such as node B, 34, to determine whether data received through an interconnect structure was received free of link errors that may have been introduced to the data during transmission. One conventional transmission error detection scheme commonly adopted by networked systems is a cyclic redundancy code (CRC) error detection scheme. In a CRC error detection scheme, the data to be transmitted is viewed as a large binary number. The node sending the data divides the large binary number formed by the data by a second binary number, referred to as a generator polynomial. The remainder from this division operation is referred to as the CRC checksum, or simply as the CRC. The sending node then appends the CRC to the data and transmits the data and the appended CRC to a receiving node via an interconnect link. Upon receiving the transmitted data and CRC, the receiving node calculates the CRC from the received data using the same generator polynomial as the sending node. The CRC calculated by the receiving node from the received data matching the CRC transmitted by the sending node indicates that the transmitted data was received free of link errors that may have been introduced during transmission. If the CRC's do not match, the receiving node typically initiates a link-layer retry mechanism to retransmit the data.

A CRC error detection scheme, however, typically detects only those errors introduced during transmission, and does not provide error indication when transmitted data is corrupt prior to its transmission. In these situations, if no errors are introduced during transmission, the transmitted CRC and the calculated CRC of the CRC error detection scheme will match, even though the data is erroneous or corrupt. As an illustrative example, assume sending node A, 32, of networked system 30 is a memory controller reading data from a memory 38 in node A. Memory controllers typically include some type of error detection/correction mechanism capable of detecting certain types of data errors and capable of correcting certain types of detected errors. If node A, 32, detects a type of uncorrectable data error while reading data from memory 38, node A must have some way of notifying node B, 34, that the data is corrupt. Otherwise, if node A, 32, merely transmits the corrupt data to node B, 34, free of transmission errors via network connection 36, the CRC calculated from the transmitted data by node B, 34, will match the CRC received from node A, 32, and node B, 34, indicating that the transmitted data is free from errors, even though the data itself is corrupted. As a result of this and other similar scenarios, various error schemes have been developed to inform a receiving node that transmitted information is erroneous or corrupt at the source.

As discussed in the Background of the Invention section of the present specification, one conventional scheme generally adopted by networked systems to alert a destination node that the information it is receiving is corrupt, even though the CRC might match, is to utilize error status bits appended to the transmitted data. If networked system 30 of the above illustrative example employs such a scheme, prior to transmission of the data, node A sets the state of the appended error status bit(s) to a state indicative of whether the transmitted data is corrupt. Upon receiving the transmitted data from node A, node B checks the state of the error status bit to determine whether the data is corrupt. Thus, in the above illustrative example, by checking the states of the error status bits, node B is aware that the received data is corrupt, even though the CRC error detection scheme indicates that the data is free from transmission errors.

Figure 2A:
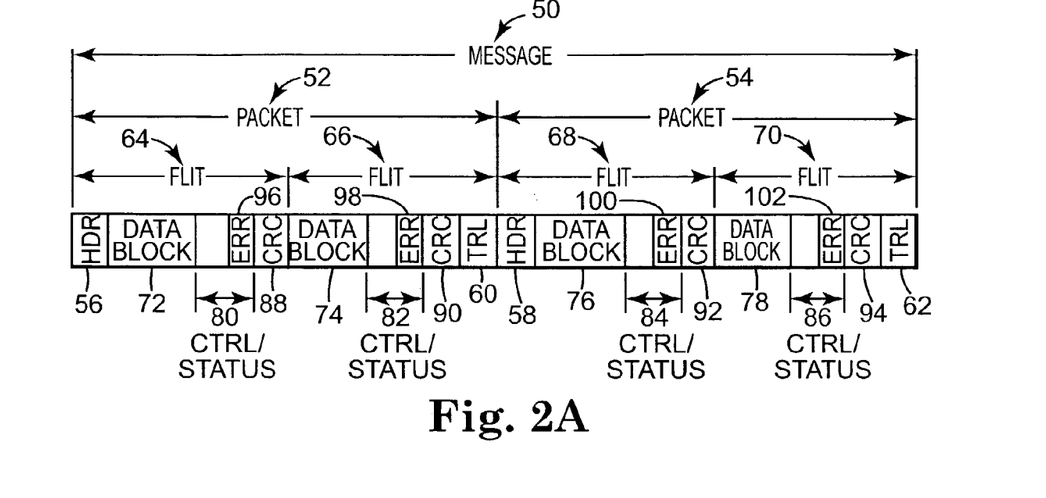
FIG. 2A is an illustrative diagram of an example packetized message configuration for physically transmitting data messages in a networked system.

FIG. 2A is an illustrative diagram of an example message configuration 50 for physically transmitting data between network system nodes, such as between nodes A indicated at 32 and node B indicated at 34 of networked system 30. Data is typically communicated between nodes in the form of a message, such as represented by message configuration 50. A message is herein defined to be an application-defined unit of data exchange between nodes. Messages are typically organized in packets, such as packets 52 and 54, for physically transmitting the message between nodes. A packet is herein defined to be a unit of data encapsulated between a network protocol header and/or trailer, such as headers 56 and 58, and trailers 60 and 62. Each packet further comprises units of data, herein referred to as flits, as indicated by flits 64, 66, 68 and 70. Each flit, in-turn, comprises a data block, as indicated by 72, 74, 76 and 78, control/status bits, as indicated by 80, 82, 84 and 86, and a CRC, as indicated by 88, 90, 92 and 94. Finally, control/status bits further include error status bits, as indicated at 96, 98, 100 and 102.

Figure 2B:
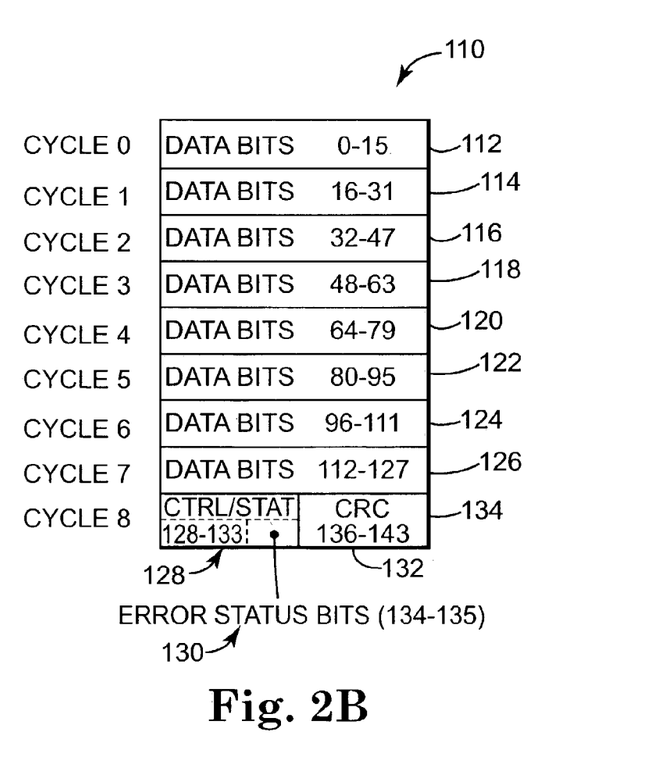
FIG. 2B is an illustrative diagram of an example flit configuration with error status bits.

FIG. 2B is an illustrative diagram of an example flit configuration 110 for networked system 30 of FIG. 1. In the illustrative example configuration of FIG. 2B, flits 110 for networked system 30 each comprise one-hundred forty-four bits, and node A 32 and node B 34 can transmit 16 bits of data per cycle via interconnect structure 36. Thus, nine cycles are required for node A, 32, to transmit flit 110 to node B, 34, via interconnect structure 36. The present invention described below can, however, apply to any suitable flit configuration and transfer rate. In the illustrative example of FIG. 2B, flit 110 comprises a data block having 128 bits, which are transmitted at 16 bits per cycle as indicated at cycles zero through eight at 112, 114, 116, 118, 120, 122, 124 and 126, respectively. In the illustrative example of FIG. 2B, flit 110 further comprises eight control/status bits 128 (indicated as bits 128–135), of which two are error status bits 130, and an eight bit CRC 132, which are transmitted at cycle eight as indicated at 134.

While error status bits, such as "poison" bits are useful in that they provide notice to a destination node that the transmitted data is corrupt in spite of the data being received free from transmission errors, they do require dedicated bit space within each flit. However, the types of data errors for which error status bits provide notification are relatively rare occurrences, with link errors accounting for a significant portion of networked system errors. Consequently, networked systems employing error status bits consume valuable bit space within each flit to notify a receiving node of only rarely occurring errors.

The below described CRC encoding scheme of the present invention can provide notification of these rarely occurring errors without the need for dedicated error bits. The data bits formerly utilized as error status bits can then be utilized by the networked system to function as other bits including, but not limited to, actual "payload" information bits and CRC bits. In one embodiment, a sending node employing the below described CRC encoding scheme of the present invention calculates an expected CRC for a flit to be transmitted and encoded the CRC by reversing a state of each bit of the expected CRC to thereby provide indication of corrupt data. In one embodiment, upon receipt of the flit and its associated CRC, a receiving node calculates an expected CRC from the received flit and compares the calculated CRC to the received CRC. In one embodiment, when the calculated CRC does not match the received CRC, the receiving node reverses the state of each bit of the calculated CRC and compares it to the received CRC. In one embodiment, when the reversed state of the calculated CRC matches the received CRC, the receiving node knows that received CRC is encoded and that the flit data is corrupt and will not initiate a link retry mechanism. In one embodiment, when the reversed state of the calculated CRC does not match the received CRC, the receiving node knows that the flit data contains transmission errors and initiates a link retry mechanism. In one embodiment, a sending node transmits to a receiving node, either prior to or subsequent to transmission of a flit having an encoded CRC, a validation flit notifying the receiving node that the encoded CRC did not occur by chance.

Figure 3:
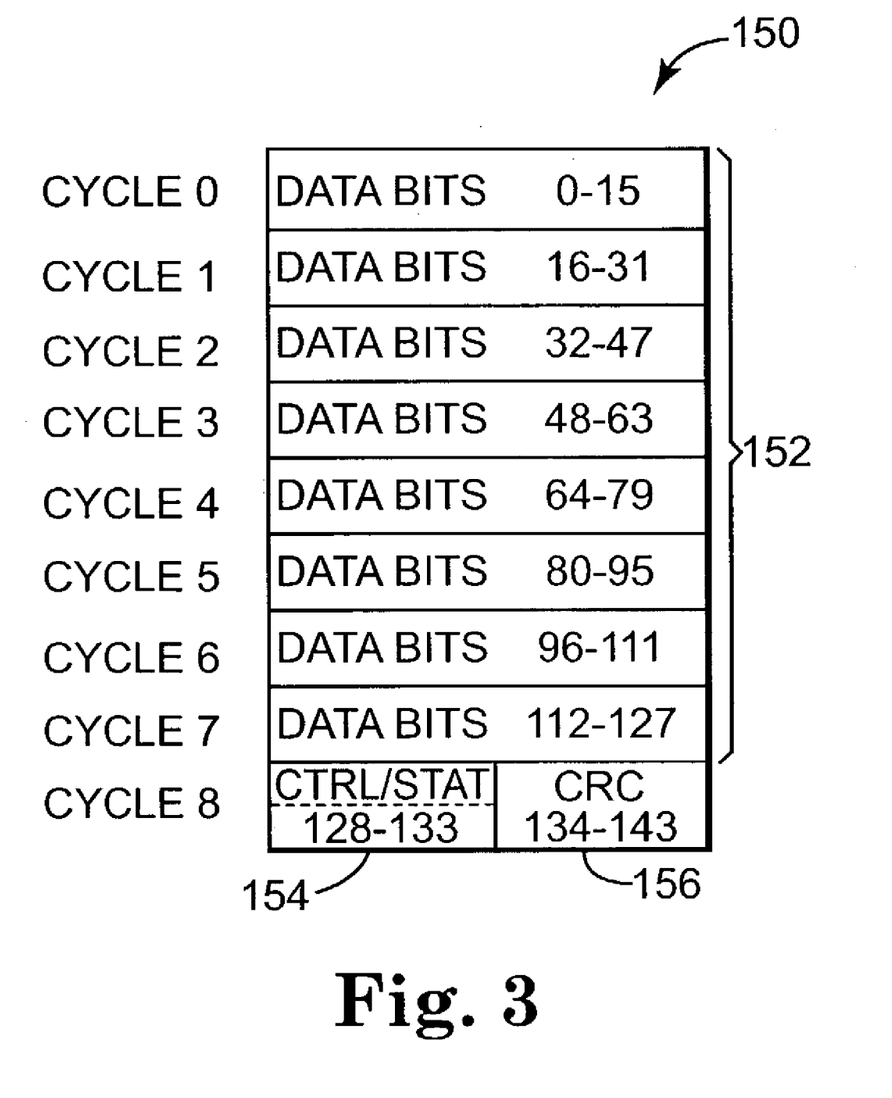
FIG. 3 is an illustrative diagram of an example flit configuration without error status bits.

FIG. 3 is an illustrative diagram of an example flit configuration 150 for networked system 30 of FIG. 1 and employing a CRC encoding scheme according to the present invention wherein bits formerly employed as error status bit are utilized as additional CRC bits. Flits 150 for networked system 30 according to the present invention each comprise one hundred forty-four bits. Like example flit 110 of FIG. 2B, flit 150 comprises a data block having 128 bits which are transmitted from node A 32 to node B 34 in eight cycles as indicated at 152. Flit 150, however, comprises six control/status bits 154 and a ten bit CRC 154, as opposed to the eight control/status bits and eight bit CRC of flit 110 of FIG. 2B. Flit 150 of FIG. 3 does not contain the error status bits of flit 110 of FIG. 2B. By encoding the state of the error status bits into the CRC and by utilizing the former error status bits as additional CRC bits, networked system 30 according to the present invention provides improved detection of transmission errors while still providing indication of data block errors.

In general, the probability that random multi-bit transmission errors will be undetected can be expresses by the following Equation I:

Probability of Undetected Multi-bit Error=$2^{(-n)}$

Where n=the number of allotted CRC bits per flit.     Equation I

When applying the above equation to networked system 30 employing flit configuration 110 as illustrated by FIG. 2B, the probability that random multi-bit errors will go undetected when transmitting flit 110 from node A 32 to node B 34 is $\frac{1}{256}$. However, when applying the above equation to networked system 30 according to the present invention and employing flit configuration 150 as illustrated by FIG. 3, the probability that random multi-bit errors will go undetected is $\frac{1}{1024}$. Thus, networked system 30 according to the present invention is four times less likely to fail to detect a multi-bit transmission error.

Figure 4:
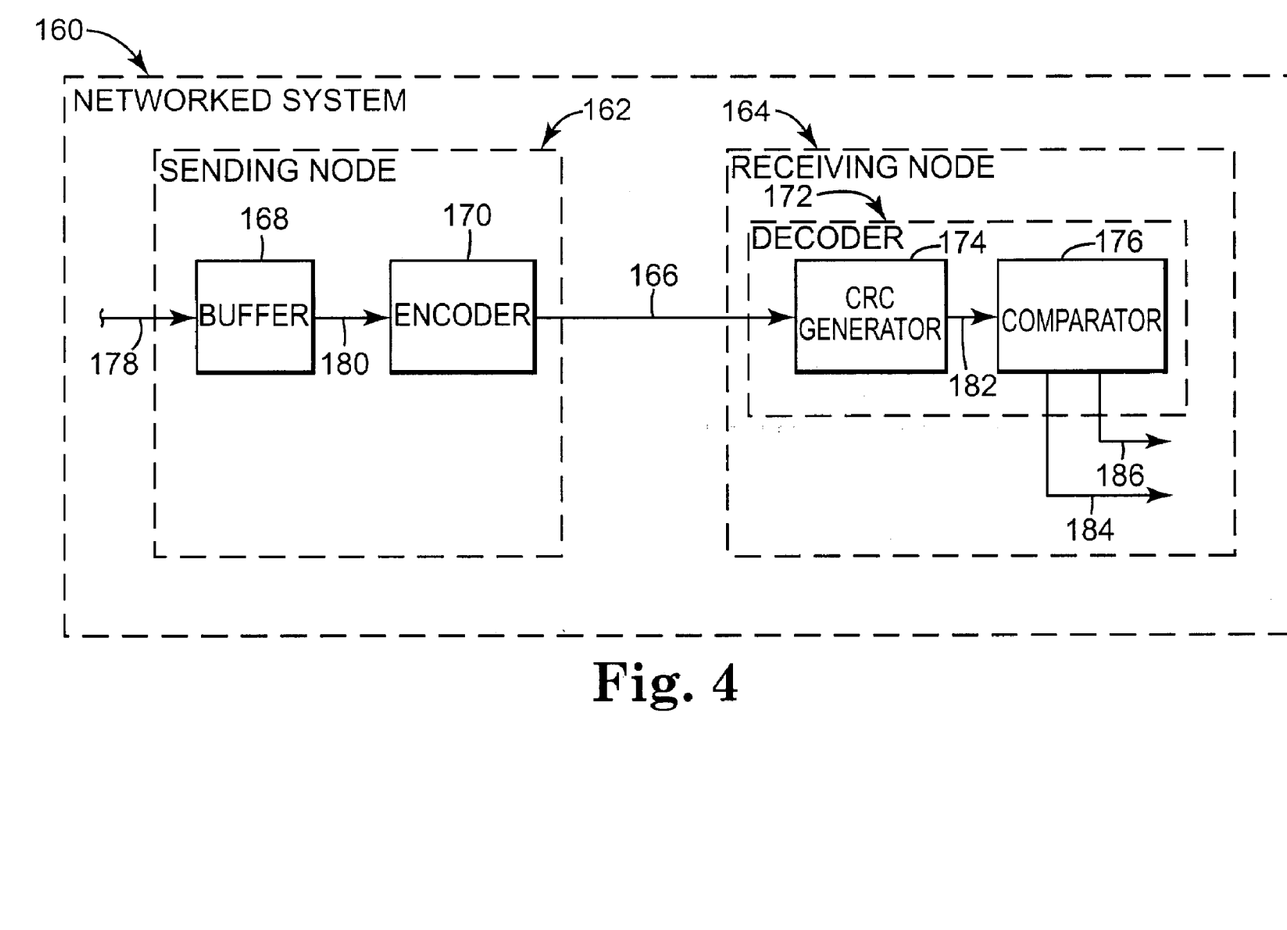
FIG. 4 is a block diagram illustrating one embodiment of a networked system according to the present invention.

FIG. 4 is a block diagram of one embodiment of a networked system 160 according to the present invention. Networked system 160 includes a sending node 162, a receiving 164, and a network connection 166. Sending node 162 includes a buffer 168 and an encoder 170. Receiving node 164 includes a decoder 172, which in-turn comprises a CRC generator 174 and a comparator 176. Network connection 166 can be any suitable type of connection including, but not limited to, a local area network (LAN) connection, a bus connection, a telephone line/modem connection a direct wireless connection, an internet connection, and/or an intranet connection.

Buffer module 168 receives a series of source flits via a line 178, with each source flit comprising a data block, control/status bits including error status bits, and a CRC. The error status bits' states indicate a presence or absence of at least one type of data error for the data block of the associated flit. Buffer module 168 provides a series of data groups to encoder 170, with each data group comprising the data block and control/status bits, including error status bits, of a corresponding source flit.

Encoder 170 generates for at least one of the data groups an expected CRC having a plurality of bits, with each bit having a state, that is a function of the data block and control/status bits, excluding error status bits. Encoder 170 then encodes the expected CRC for the at least one data group with the state of the error status bits to generate an encoded CRC. In one embodiment, encoder 170 generates the encoded CRC for the at least one data group by reversing the state of a predetermined plurality of bits of the expected CRC for the at least one data group. In one embodiment, when a state of the error status bits indicates the absence of a data block error, the encoder does not reverse the state of any bits of the expected CRC, and the encoded CRC equals the expected CRC. In one embodiment, the encoder encodes a state of the error status bits indicating a first type of data block error by reversing the state of each bit of the expected CRC. In one embodiment, the encoder encodes a state of the error status bits indicating a second type of data block error by reversing the state of every other bit of the expected CRC.

Encoder 170 then provides the series of data groups, not including the error status bits, and the encoded CRC for the at least one data group to CRC generator 174 via network connection 166. CRC generator 174 generates a calculated CRC for the at least one data group that is a function of its associated data block and control/status bit, not including error status bits. Comparator 176 is coupled to CRC generator 174 by a line 182, and compares the calculated CRC to the encoded CRC for the at least one data group. In one embodiment, when the calculated CRC does not match the encoded CRC, comparator 176 provides an error signal at 184. In one embodiment, comparator 176 compares the encoded CRC to a predetermined plurality of designated CRC values and provides an encoding signal at 186.

Figure 5:
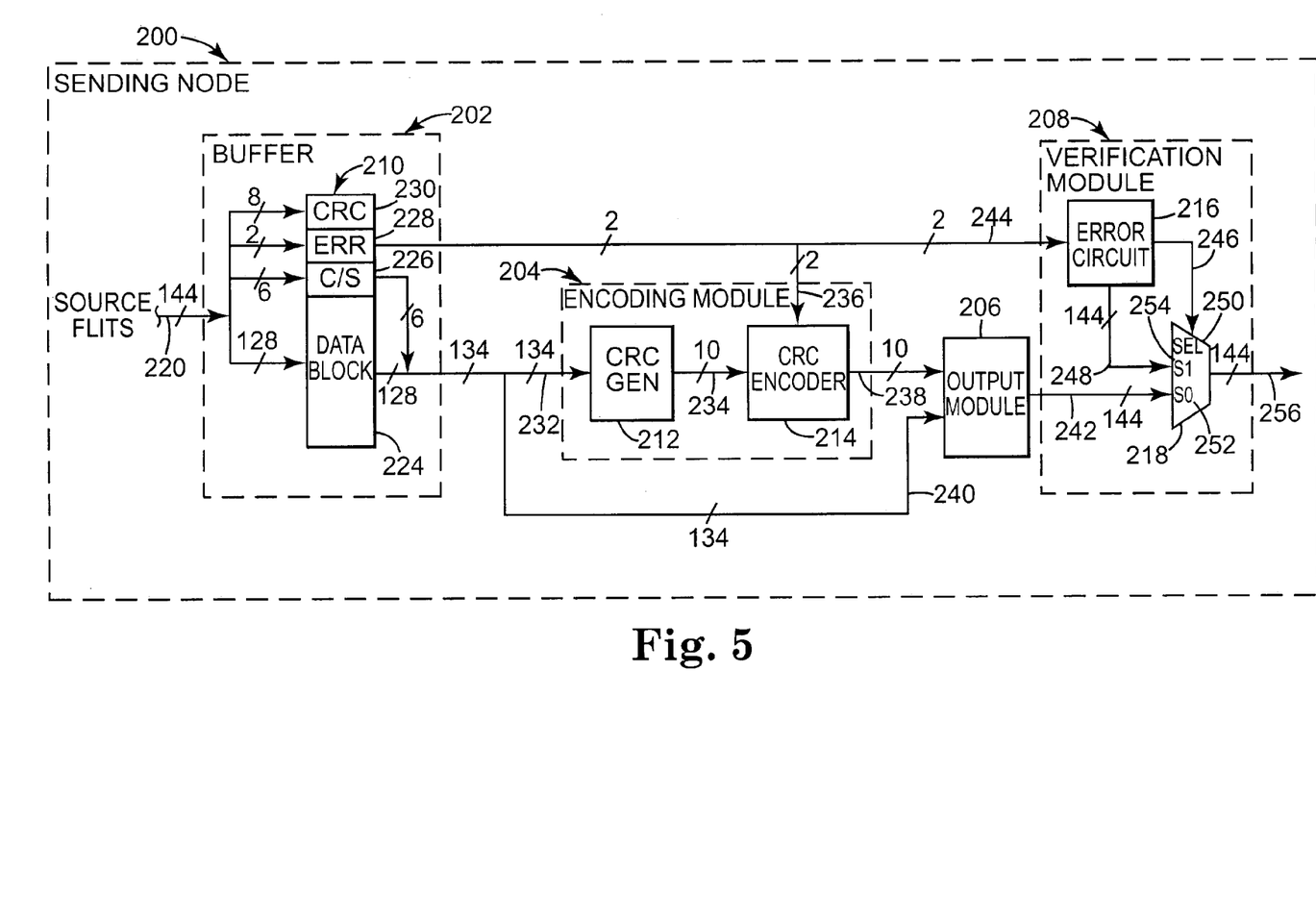
FIG. 5 is a block diagram illustrating one embodiment of a sending node according to the present invention.

FIG. 5 is a block diagram of one embodiment of a sending node 200 having a CRC encoding scheme for conveying status information according to the present invention. Sending node 200 comprises a buffer 202, an encoding module 204, an output module 206, and a verification module 208. Buffer module 210 includes a buffer register 210, encoding module 204 includes a CRC generator 212 and a CRC encoder 214, and verification module 208 includes an error circuit 216 and a multiplexer 218. Buffer register 210 receives a series of source flits via a path 220 with each source flit comprising a data block 224, a CRC 230, and control/status bits 226 including at least one error status bit 228 having a plurality of states indicative of a presence or absence of at least one type of data block error. For illustrative purposes, each source flit received by buffer register 210 of sending node 200 has a configuration equal to that of example flit configuration 110 of FIG. 2B. Buffer 210 segregates each source flit into its component bits as indicated by data block 224, control/status bits excluding error status bits 226, error status bits 228, and CRC 230.

CRC generator 212 receives data block 224 and control/status bits 226 via a path 232 and provides an expected CRC at 234 that is a function of data block 224 and control/status bits 226. The expected CRC comprises a plurality of bits with each bit having a state. For illustrative purposes, the expected CRC comprises ten bits as indicated at path 234. CRC encoder 214 receives the expected CRC from CRC generator 212 at 234, and error status bits 228 from buffer register 210 via a path 236, and encodes the expected CRC with the state of error status bits 228 to thereby generate an encoded CRC at 238. In one embodiment, CRC encoder 214 encodes the expected CRC with the state of error status bits 228 by reversing the state of a predetermined plurality of bits of the expected CRC. In one embodiment, CRC encoder 214 encodes the expected CRC with the state of error status bits 228 by reversing the state of each bit of the expected CRC. In one embodiment, when the state of error status bits 228 indicates an absence of data block errors, CRC encoder 214 does not reverse the state of any bits of the expected CRC, and the encoded CRC matches the expected CRC.

Output module 206 receives data block 224 and control/status bits 226 via a path 240 and receives the encoded CRC at 238, and combines them to provide a transmission flit via a path 242. For illustrative purposes, each transmission flit provided by output module 206 has a configuration equal to that of example flit configuration 150 of FIG. 3, with a 128-bit data block, six control/status bit, and a 10-bit CRC.

Error circuit 216 receives error status bits 228 via a path 244 and provides a selector signal via a path 246 and a validation flit via a path 248. Multiplexer 218 includes a selector input (SEL) 250 coupled to error circuit 216 via path 246, a first input (S0) 252 coupled to output module 206 and receiving the transmission flit via path 242, a second input (S1) 254 coupled to error circuit 216 and receiving a validation flit via a path 248, and has an output 256. In one embodiment, when error status bits 228 indicate an absence of a data block error, error circuit 216 provides a selector signal via path 246 to selector input 250 instructing multiplexer 218 to select first input (S0) 252 to thereby provide the transmission flit via multiplexer output 256. In one embodiment, when error status bits 228 indicate a presence of a data block error, error circuit 216 provides a selector signal via path 246 to selector input 250 instructing multiplexer 218 to first select first input (S0) 252 to thereby provide the transmission flit via output 256, and to then select second input (S1) 254 to thereby provide the validation flit via output 256. In one embodiment, when error status bits 228 indicate a presence of a data block error, error circuit 216 provide a selector signal via path 246 to selector input 250 instructing multiplexer 218 to first select second input (S1) 254 to thereby provide the validation flit via output 256, and to then select first input (S0) 252 to thereby provide the transmission flit via output 256.

The validation flit provided by verification module 208 when error status bits 228 indicate a presence of a data block error functions to notify a receiving node that the encoded CRC of the transmission flit intentionally does not match the expected CRC and is intended to have match a specially designated CRC value. In one embodiment, the validation flit precedes the transmission flit for which it serves as a notification. In one embodiment, the validation flit is subsequent to the transmission flit for which it serves as notification.

Figure 6:
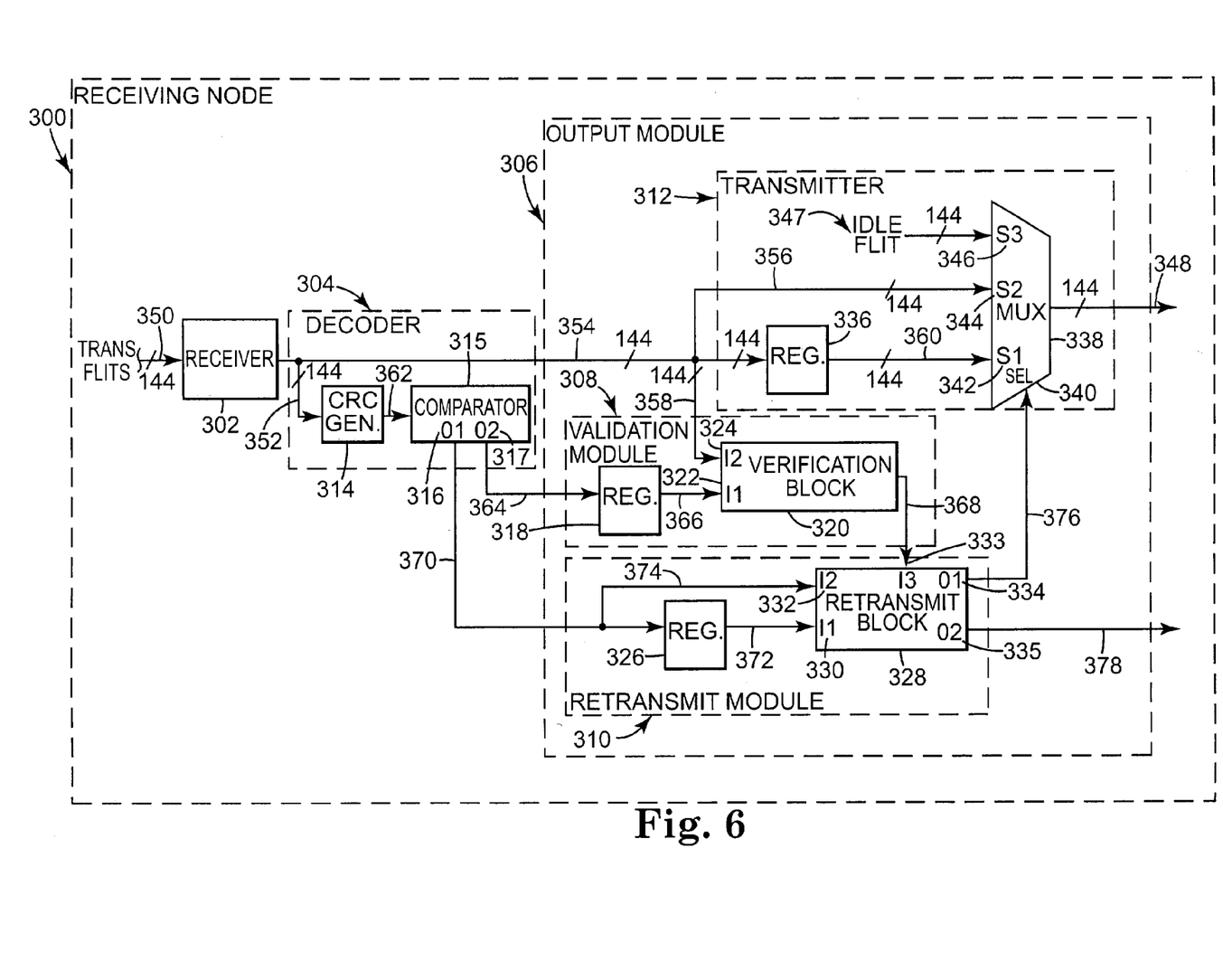
FIG. 6 is a block diagram illustrating one embodiment of a receiving node according to the present invention.

FIG. 6 is a block diagram of one exemplary embodiment of a receiving node 300 having a CRC encoding scheme for conveying status information according to the present invention. Sending node 300 of the exemplary embodiment is configured to receive a validation flit as the transmission flit immediately following a transmission flit having a CRC purposefully encoded with data block error status information. Receiving node 300 can, however, be modified to receive a validation flit as a transmission flit any number of flits preceding or subsequent to a flit having a CRC purposefully encoded with data block error status information.

Receiving node 300 comprises a receiver 302, a decoder 304, a validation module 308, a retransmit module 310, and a transmitter 312. Decoder 304 further comprises a CRC generator 314 and a comparator 315 having a first output (O1) 316 and a second output (O2) 317. Validation module 308 further comprises a register 318 and a verification block 320 having a first input (I1) 322 and a second input (I2) 324. Retransmit module 310 further comprises a register 326 and a retransmit block 328 having a first input (I1) 330, a second input (I2) 332, a third input (I3) 333, a first output (O1) 334, and a second output (O2) 335. Transmitter 312 comprises a register 336 and a multiplexer 338 having a selector input (SEL) 340, a first input (S1) 342, a second input (S2) 344, a third input (S3) 346, and an output 348.

Receiver 302 receives a series of transmission flits via a path 350 with each transmission flit comprising a data block, control/status bits, and an encoded CRC. For illustrative purposes, each transmission flit received buffer 302 has a configuration equal to that of example flit configuration 150 of FIG. 3. Receiver 302 provides the series of transmission flits to CRC generator 314 via a path 352, to transmitter register 336 via a path 354, to second input (S2) 344 of multiplexer 338 via a path 356, and to second input (I2) 324 of verification block 320 via a path 358. With receipt of each subsequent flit of the series of transmission flits from receiver 302, transmitter register 336 provides the preceding transmission flit via a path 360 to first input (S1) of multiplexer 338. As a result, receiver 302 provides a current transmission flit of the series while transmitter register 336 provides an immediately preceding transmission flit of the series.

CRC generator 314 receives the current transmission flit from receiver 302 and calculates an expected CRC that is a function of a data block and control/status bits of the current transmission flit. CRC generator 314 provides the expected CRC and the encoded CRC for the current transmission flit to comparator 316 via a path 362. Comparator 315 compares the expected CRC to the encoded CRC. In one embodiment, comparator 315 provides at first output (O1) 316 an error signal having a first state when the expected CRC matches the encoded CRC, and having a second state when the expected CRC does not match the encoded CRC. Comparator 315 also compares the encoded CRC for the current transmission flit to a predetermined plurality of specially designated CRC values. In one embodiment, comparator 315 provides at second output (O2) 317 an encoding signal having a first state when the encoded CRC does not match any of the plurality of specially designated CRC values, and having a second state when the encoded CRC matches any one of the plurality of specially designated CRC values.

Register 318 receives the encoding signal for the current transmission flit from comparator 315 via a path 364. With receipt of an encoding signal for each subsequent transmission flit of the series from comparator 315, register 318 provides an encoding signal for the preceding transmission flit to first input (I1) 322 of verification block 320 via a path 366. As a result, when register 318 receives the encoding signal for the current transmission flit from comparator 315, it provides the encoding signal for the immediately preceding transmission flit of the series to first input (I1) 322 of verification block 320.

Verification block 320 receives the current transmission flit at first input (I2) 324 and the encoding signal for the immediately preceding transmission flit at first input (I1) 322. As described above, receiving node 300 is configured to receive a validation flit as the transmission flit immediately following a transmission flit having an encoded CRC intentionally having a specially designated CRC value. In the example configuration of FIG. 6, a validation flit thereby functions to notify receiving node 300 that the encoded CRC of the immediately preceding transmission flit of the series intentionally matches one of the plurality of specially designated CRC values and that the match did not occur merely by chance. In one embodiment, verification block 320 provides a verification signal at 368 having a first state when the encoding signal for the immediately preceding transmission flit at first input (I1) 322 indicates that the encoded CRC of the preceding flit does not match one of the specially designated CRC values or when verification block 320 determines that the current transmission flit at second input (I2) 324 is not a validation flit, and provides a verification signal at 368 having a second state when the encoding signal for the preceding flit at first input (I1) 322 indicates that the encoded CRC of the preceding flit matches one of the specially designated CRC values and when verification block 320 determines that the current transmission flit at second input (I2) 324 is a validation flit.

Multiplexer 338 of transmitter 312 receives the preceding transmission flit from register 336 at first input (S1) 342, receives the current transmission flit from receiver 302 at second input (S2) 344, and receives an idle flit 347 at third input (S3) 346. Idle flit 347, when provided by multiplexer 338, functions to notify a destination process downstream of output 348 that a potential data error exists and to standby for a resumption of data transfer or for a retransmission of data.

Register 326 of retransmit module 310 receives the error signal from first output (O1) 316 of comparator 315 via a path 370. With receipt of an error signal for each subsequent transmission flit from comparator 315, register 326 provides an error signal for the preceding transmission flit to first input (I1) 330 of retransmit block 328. Thus, when register 326 receives the error signal for the current transmission flit from comparator 315 via path 370, register 326 provides the error signal for the immediately preceding transmission flit to first input (I1) 330 of retransmit block 328 via a path 372.

Retransmit block 328 receives the error signal for the preceding transmission flit from register 326 at first input (I1) 330 via path 372, the error signal for the current transmission flit from comparator 315 at second input (I2) 332 via a path 374, and the verification signal from verification block 320 at third input (I3) 333 via path 368. Retransmit block 328 provides a selector signal at first output (O1) 334 to selector input (SEL) 370 of multiplexer 338 via a path 376 and a retransmit signal at second output (O2) 335 via a path 378. The selector and retransmit signal each have a state that is dependent upon the states of the previous transmission flit error signal at first input (I1) 330, the current transmission flit error signal at second input (I2) 332, and the verification signal at third input (I3) 333. When the selector signal has a first, second and a third state, multiplexer 338 selects first input (S1) 342, second input (S2) 344, and third input (S3) 246, respectively, to be output to a destination process at 348. Multiplexer 338 provides the retransmit signal at a first state to initiate a link-layer re-transfer mechanism to re-transmit transmission flits when a transmission error has been detected, and at a second state when no retransmission of data is desired.

Table I below illustrates the states of the selector signal (SEL) and retransmit signal (RET) provided by one example suitable retransmit block 328 at first output (O1) 334 and second output (O2), respectively, based on the eight potential scenarios of states at first input (I1) 330, second input (I2) 332, and third input (I3) 333. A value of 0 for first input (I1) 330 indicates that for the preceding transmission flit the encoded CRC matched the expected CRC, while a value of 1 indicates that the encoded CRC did not match the expected CRC. A value of 0 for second input (I2) 332 indicates that for the current transmission flit the encoded CRC matches the expected CRC, while a value of 1 indicates that the encoded CRC does not match the expected CRC. A value of 0 for third input (I3) 333 indicates that either the encoded CRC for the preceding transmission flit did not match a specially designated CRC value or that current transmission flit is not validation flit indicating that the encoded CRC of the preceding flit was intended to match a specially designated CRC value, while a value of 1 indicates that the encoded CRC for the preceding flit did match a specially designated CRC value and that the current flit is a validation flit verifying that the encoded CRC of the preceding flit was intended to match a specially encoded CRC value. For first output (O1) 334, S1, S2 and S3 indicate the selector signal instructing multiplexer 338 to select first input (S1) 342, second input (S2) 344, and third input (S3) 346, respectively. Regarding second output (O2) 335, NO indicates that the retransmit signal will not initiate the link-layer retry mechanism, while YES indicates that a transmission error may have occurred and the retransmit signal will initiate the link-layer retry mechanism.

TABLE I

| SCENARIO | RETRANSMIT BLOCK INPUTS | | | | |
| --- | --- | --- | --- | --- | --- |
| | Preceding Flit | Present Flit | | RETRANSMIT BLOCK INPUTS | |
| | Error Signal (I1) | Error Signal (I2) | Verification Signal (I3) | Selector Signal (O1) | Retransmit Signal (O2) |
| 1 | 0 | 0 | 0 | S2 | NO |
| 2 | 0 | 0 | 1 | S3 | YES |
| 3 | 0 | 1 | 0 | S3 | NO |
| 4 | 0 | 1 | 1 | S3 | YES |
| 5 | 1 | 0 | 0 | S3 | YES |
| 6 | 1 | 0 | 1 | S1 | NO |
| 7 | 1 | 1 | 0 | S3 | YES |
| 8 | 1 | 1 | 1 | S3 | YES |

Example scenarios one, three, five and six of Table I are described below to further illustrate the operation of receiving node 300 of FIG. 6. In example scenario one, receiver 302 receives and provides a current transmission flit to CRC generator 314 via path 352, to register 336 via path 354, to second input (S2) 344 of multiplexer 338 via path 356, and to second input (I2) 324 of verification block 320 via path 358. For illustrative purposes, assume that the current transmission flit is not a validation flit and that a preceding transmission flit having no data block or transmission errors was received and provided by receiver 302.

CRC generator 314 calculates an expected CRC for the current transmission flit and provides the expected CRC and the encoded CRC for the current transmission flit to comparator 315 via path 362. Comparator 315 compares the encoded CRC to the expected CRC and provides at first output (O1) 316 to register 326 via path 370 and to second input (I2) 332 of retransmit block 328 via path 374 an error signal indicating the encoded CRC for the current transmission flit matches the expected CRC. Upon receipt of the error signal for current transmission flit, register 326 provides via path 372 to first input (I1) 330 of retransmit block 328 the error signal for the preceding transmission flit, in this scenario indicating the encoded CRC matched the expected CRC for the preceding transmission flit.

Comparator 315 also provides via second output (O2) 317 to register 318 via path 364 an encoding signal indicating whether the encoded CRC for the current transmission flit matches a specially designated CRC value. Upon receipt of the encoding signal for the current transmission flit, register 318 provides to first input (I1) 322 of verification block 320 the encoding signal for the preceding transmission flit, in this scenario indicating that the encoded CRC did not match a specially designated CRC value. Verification block 320, in turn, provides to third input (I3) 333 of transmit block 328 via path 368 a verification signal indicating the present transmission flit is not a validation flit and/or the encoded CRC of the preceding flit did not match a specially designated CRC value.

Retransmit block 328, based upon the error signal state for the preceding transmission flit at first input (I1) 330, the error signal state for the current transmission flit at second input (I2) 332, and the verification signal state at third input (I3) 333 provides a selector signal at output (O1) 334 to multiplexer selector (SEL) 340 instructing multiplexer 338 to select second input (S2) 344 to thereby provide the current transmission flit to a destination process at output 348. Based upon the same inputs, retransmit block 328 does not provide a retransmit signal at second output (O2) 335 and thus, does not initiate the link-level retry mechanism.

In example scenario three, receiver 302 receives and provides a current transmission flit to CRC generator 314 via path 352, to register 336 via path 354, to second input (S2) 344 of multiplexer 338 via path 356, and to second input (I2) 324 of verification block 320 via path 358. For illustrative purposes, assume that the current transmission flit is not a validation flit and that a preceding flit having no data block or transmission errors was received and provided by receiver 302.

CRC generator 314 calculates an expected CRC for the current transmission flit and provides the expected CRC and the encoded CRC for the current transmission flit to comparator 315 via path 362. Comparator 315 compares the encoded CRC to the expected CRC and provides at first output (O1) 316 to register 326 via path 370 and to second input (I2) 332 of retransmit block 328 via path 374 an error signal indicating the encoded CRC for the current transmission flit does not match the expected CRC. Upon receipt of the error signal for current transmission flit, register 326 provides via path 372 to first input (I1) 330 of retransmit block 328 the error signal for the preceding transmission flit, in this scenario indicating the encoded CRC matched the expected CRC for the preceding transmission flit.

Comparator 315 also provides via second output (O2) 317 to register 318 via path 364 an encoding signal indicating whether the encoded CRC for the current transmission flit matches a specially designated CRC value. Upon receipt of the encoding signal for the current transmission flit, register 318 provides to first input (I1) 322 of verification block 320 the encoding signal for the preceding transmission flit, in this scenario indicating that the encoded CRC did not match a specially designated CRC value. Verification block 320, in turn, provides to third input (I3) 333 of transmit block 328 via path 368 a verification signal indicating the present transmission flit is not a validation flit and/or the encoded CRC of the preceding flit did not match a specially designated CRC value.

Retransmit block 328, based upon the error signal state for the preceding transmission flit at first input (I1) 330, the error signal state for the current transmission flit at second input (I2) 332, and the verification signal state at third input (I3) 333 provides a selector signal at output (O1) 334 to multiplexer selector (SEL) 340 instructing multiplexer 338 to select third input (S3) 346 to thereby provide idle flit 347 to a destination process at output 348. Based upon the same inputs, retransmit block 328 does not provide a retransmit signal at second output (O2) 335 and thus, does not initiate the link-level retry mechanism.

In example scenario three, receiving node 300 outputs idle flit 347 and holds the current transmission flit, the encoded CRC of which does not match the calculated CRC, in register 336 of output module 306. Receiving node 300 waits to receive the subsequent transmission flit of the series to determine whether it is a validation flit and then, based upon the state of the encoding signal held in register 318, determines whether to provide the current transmission flit being held in register 336 at output 348 of multiplexer 338 and whether to provide a retransmit signal initiating a retry mechanism at 378. Example scenarios five and six as described together below and describe two potential responses of receiving node 300 after receiving a subsequent transmission flit when a current flits CRC is in error as illustrated by example scenario three above.

In example scenario five and six, receiver 302 receives and provides a current transmission flit to CRC generator 314 via path 352, to register 336 via path 354, to second input (S2) 344 of multiplexer 338 via path 356, and to second input (I2) 324 of verification block 320 via path 358. For this scenario, an immediately preceding transmission flit was received having an encoded CRC not matching a calculated CRC.

CRC generator 314 calculates an expected CRC for the current transmission flit and provides the expected CRC and the encoded CRC for the current transmission flit to comparator 315 via path 362. Comparator 315 compares the encoded CRC to the expected CRC and provides at first output (O1) 316 to register 326 via path 370 and to second input (I2) 332 of retransmit block 328 via path 374 an error signal indicating the encoded CRC for the current transmission flit matches the expected CRC. Upon receipt of the error signal for the current transmission flit, register 326 provides via path 372 to first input (I1) 330 of retransmit block 328 the error signal for the preceding transmission flit, in this scenario indicating that the encoded CRC did not match the expected CRC.

Comparator 315 also provides via second output (O2) 317 to register 318 via path 364 an encoding signal indicating whether the encoded CRC for the current transmission flit matches a specially designated CRC value. Upon receipt of the encoding signal for the current transmission flit, register 318 provides to first input (I1) 322 of verification block 320 the encoding signal for the preceding transmission flit.

Verification block 320 then provides an encoding signal at 368 to third input (I3) 333 of retransmit block 328, the state of the encoding depending upon whether the encoding signal for the previous flit at first input (I1) 322 indicates a match between the encoded CRC and a specially designated CRC value and whether the current transmission flit is a validation flit. Under scenario five, verification block 320 provides a verification signal having a state indicating that the current transmission flit is not a verification flit and/or the encoded CRC of the preceding flit did not match a specially designated CRC value. Under scenario six, verification block provides a verification signal having a state indicating that encoded CRC of the preceding transmission flit matches a specially designated CRC value and that the current transmission flit is a validation flit indicating that the encoded CRC of the preceding transmission flit intentionally matches the specially designated CRC value.

Retransmit block 328, based upon the error signal state for the preceding transmission flit at first input (I1) 330, the error signal state for the current flit at second input (I2) 332, and the verification signal state at third input (I3) 333 provides a selector signal at first output (O1) 334 to multiplexer select input (SEL) via path 376 and provides a retransmit signal at second output (O2) via path 378. Under scenario five, the inputs to retransmit block 328 indicate that the encoded CRC of the preceding transmission flit is not encoded with error status information but simply indicate a presence of transmission errors. Consequently, retransmit block 328 provides a selector signal having a state instructing multiplexer 338 to select third input (S3) 346 to thereby provide idle flit 347 at output 348 and provides a retransmit signal having a state instructing the sending node to initiate a link-level retry mechanism beginning with the preceding transmission flit. Under scenario six, the inputs to retransmit block 328 indicate that the encoded CRC of the preceding transmission flit is intentionally encoded with error status information. Consequently, retransmit block 328 provides a selector signal having a state instructing multiplexer 338 to select first input (S1) 342 to thereby provide the preceding transmission flit at output 348 and provides a retransmit signal having a state that does not initiate the link-level retry mechanism.

While example scenarios two, four, seven and eight are not discussed here, receiving node 300 operates in manner consistent with scenarios one, three, five and six, as described above, to provide the values listed in Table I.

In conclusion, by encoding CRC data bits with status information regarding rarely occurring data error events, networked systems employing a CRC encoding scheme according to the present invention, particularly those systems having limited bandwidths, can more effectively utilize limited transmission bit capacity. In particular, a networked system according to the present invention and utilizing bits formerly dedicated for use as error status bits as additional CRC bits can continue to transfer data at the same rate but with increased detection of more commonly occurring transmission errors.

What is claimed is:

1. A sending node comprising:
an encoding module configured to receive a series of data groups with each data group comprising a data block comprising data bits, and control/status bits including at least one error status bit having a state indicative of a presence or absence of at least one type of data block error, and configured to generate for at least one of the data groups of the series an expected cyclic redundancy code (CRC) comprising a plurality of bits that is a function of the data block and control/status bits, not including the at least one error status bit, and configured to encode the expected CRC with the state of the at least one error status bit to thereby generate for the at least one data group an encoded CRC comprising a plurality of bits.

2. The sending node of claim 1, wherein the encoding module comprises:
a CRC generator configured to receive the data block and the control/status bits for the at least one data group, not including the at least one error status bit, and configured to provide the expected CRC; and
an encoding module configured to receive from the CRC generator the expected CRC and to receive the at least one error status bit, and configured to generate the encoded CRC for the at least one data group.

3. The sending node of claim 2, wherein the encoded CRC is equal to the expected CRC when the state of at least one error status bit is indicative of the absence at least one type of data block error.

4. The sending node of claim 2, wherein the expected CRC comprises M bits in M bit positions with each bit having a state, and wherein the encoding module reverses the state of a predetermined plurality of the M bits in a predetermined plurality of the M bit positions to generate the encoded CRC.

5. The sending node of claim 4, wherein the encoding module reverses the state of each bit of the expected CRC to generate the encoded CRC to thereby indicate a particular type of data block error.

6. The sending node of claim 4, wherein the encoding module reverses the state of every other bit of the expected CRC beginning with a first bit position to generate the encoded CRC to thereby indicate a particular type of data block error.

7. The sending node of claim 4, wherein the encoding module reverses the state of every other bit of the expected CRC beginning with a second bit position to generate the encoded CRC to thereby indicate a particular type of data block error.

8. The sending node of claim 1, further comprising:
a buffer configured to receive a series of source flits from a source node, with each source flit comprising one data group of the series of data groups and an associated source CRC having a plurality of bits, and configured to provide the series of data groups.

9. The sending node of claim 8, wherein the buffer comprises:
a register having a plurality of bit positions configured to receive the series of source flits, configured to segregate each source flit of the series into its corresponding data block data bits, source CRC bits, at least one error status bit, and into control/status bits not including the at least one error status bit, and configured to provide the data block, the at least one error status bit, and the control/status bit not including the at least one error status bit, of the at least one data group.

10. The sending node of claim 1, further comprising:
an output module configured to receive the at least one data group, not including the at least one error status bit, and configured to receive the encoded CRC for the at least one data group to thereby provide a transmission flit comprising the at least one data group, not including the at least one error status bit, and the encoded CRC for the at least one data group.

11. The sending node of claim 10, further comprising:
a verification module configured to receive the transmission flit and the at least one error status bit for the at least one data group, configured to provide the transmission flit, and to provide a verification flit when the state of the at least one error status indicates a presence of the at least one type of data block error.

12. The sending node of claim 11, wherein the verification module comprises:
an error circuit configured to receive the at least one error status bit of the at least one data group, and configured to provide the verification flit, and to provide a selector signal indicative of the state of the at least one error status bit; and
a multiplexer configured to receive the transmission flit, the verification flit, and the selector signal, configured to provide the transmission flit, and to provide the verification flit when the selector signal indicates that the state of the at least one error status indicates a presence of the at least one type of data block error.

13. A receiving node comprising:
a decoder comprising:
a CRC generator configured to receive a series of transmission flits with each flit comprising an encoded CRC having M bits and a data group including a data block and control/status bits, and configured to generate for at least one transmission flit an expected CRC that is a function the data group of the at least one transmission flit; and
a comparator configured to compare the encoded CRC to the expected CRC for the at least one transmission flit to determine whether a transmission error is present in the at least one transmission flit, and to compare the encoded CRC to at least one specially designated CRC to determine whether the data block of the at least one transmission flit contained corrupt data prior to transmission.

14. The receiving node of claim 13, wherein the data group does not include at least one error status bit having a state indicative of a presence or absence of at least one type of data block error, and wherein the encoded CRC is a function of the data group prior to transmission and is encoded with the state of the at least one error status bit.

15. The receiving node of claim 13, wherein the expected CRC comprises M bits in M bit positions with each bit having a state, and wherein the comparator reverses the state of a predetermined plurality of the M bits in a predetermined plurality of the M bit positions of the expected CRC to thereby provide the at least one specially designated CRC.

16. The receiving node of claim 13, wherein the comparator further provides an error signal indicative of whether the expected CRC matches the encoded CRC for the at least one transmission flit and provides an encoding signal indicative of whether the encoded CRC for the at least one transmission flit matches the at least one specially designated CRC.

17. The receiving node of claim 16 further comprising:
an output module configured to receive the at least one transmission flit, the error signal, and the encoding signal, and configured to provide in a first response the at least one transmission flit when the error signal indicates that the expected CRC matches the encoded CRC for the at least one transmission flit, to provide in a second response the at least one transmission flit when the error signal indicates that the expected CRC does not match the encoded CRC and the encoding signal indicates that the encoded CRC matches the at least one specially designated CRC, and to provide in a third response an idle flit and a retransmit signal when the error signal indicates that the expected CRC does not match the encoded CRC and the encoding signal indicates that the encoded CRC does not match the at least one specially designated CRC.

18. The receiving node of claim 17, wherein the output module is further configured to receive a validation flit indicative of whether the encoded CRC for the at least one transmission flit intentionally matches the at least one specially designated CRC, and the second response is to first provide an idle flit when the error signal indicates the expected CRC does not match the encoded CRC and to then provide the at least one transmission flit when the encoding signal indicates the encoded CRC matches the at least one designated CRC and the validation flit indicates that the encoded CRC intentionally matches the at least one designated CRC, and the third response is to first provide an idle flit when the error signal indicates the expected CRC does not match the encoded CRC and to then provide the retransmit signal when the encoding signal indicates the encoded CRC does not match the at least one specially designated CRC or the validation flit is either not received or indicates the encoded CRC does not intentionally match the at least one specially designated CRC.

19. The receiving node of claim 18, wherein the output module comprises:
a validation module coupled to the decoder and configured to receive the encoding signal of the at least one transmission flit and the validation flit, and configured to provide a validation signal indicative of whether the encoded CRC of the at least one transmission flit intentionally matches the at least one designated CRC;

a retransmit module coupled to the decoder and to the validation module and configured to receive the validation signal and to receive the error signal for the at least one transmission flit, and configured to provide the retransmit signal and an output control signal; and a transmitter coupled to the decoder and to the retransmit module and configured to receive the at least one transmission flit and the output control signal, and configured to provide the at least one transmission flit or the idle flit depending on a state of the output control signal.

20. The receiving node of claim 19, wherein the validation block comprises:

a register coupled to the comparator and configured to receive the encoding signal for a subsequent transmission flit of the series of transmission flits and to provide the encoding signal for the at least one transmission flit; and a verification block coupled to the first register and configured to receive the validation flit and the encoding signal for the at least one transmission flit, and configured to provide the validation signal having a first state when the encoding signal indicates the encoded CRC of the at least one transmission flit matches the at least one specially designated CRC and the validation flit indicates the match was intentional, and to provide the validation signal having a second state when the encoding signal indicates the encoded CRC of the at least one transmission flit does not match the at least one specially designated CRC or the validation flit indicates the encoded CRC of at least one transmission flit was not intended to match the at least one specially designated CRC.

21. The receiving node of claim 19, wherein the retransmit block comprises:

a register coupled to the comparator and receiving the error signal for a transmission flit subsequent to the at least one transmission flit and providing the error signal for the at least one transmission flit; and a retransmit block coupled to the comparator, the register, and to the validation block, and configured to receive the error signal for the at least one transmission flit, to receive the error signal for the subsequent transmission flit, and to receive the validation signal, and configured to provide the output select signal and the retransmit signal.

22. The receiving node of claim 19, wherein the transmitter block comprises:

a register coupled to the decoder and configured and receiving the subsequent transmission flit of the series of transmission flits and providing the at least one transmission flit of the series; and a multiplexer having a first input coupled to the register and receiving the at least one transmission flit, a second input coupled to the decoder and receiving a subsequent transmission flit of the series, a third input receiving an idle flit, a selector input coupled to the retransmit block and receiving the output select signal; and configured to provide at an output the first, second, or third input depending on a state of the output select signal.

23. A networked system comprising:
a network connection;
a sending node coupled to the network connection and comprising:

an encoding module configured to receive a series of data groups with each data group comprising a data block comprising data bits, and control/status bits including at least one error status bit having a state indicative of a presence or absence of at least one type of data block error, and configured to generate for at least one of the data groups of the series an expected cyclic redundancy code (CRC) that is a function of the data block and control/status bits, not including the at least one error status bit, and configured to encode the expected CRC with the state of the at least one error status bit to thereby generate for the at least one data group an encoded CRC comprising a plurality of bits; and a receiving node coupled to the network connection and comprising:

a decoder configured to receive from the sending node the at least one data group, not including the at least one error status bit and the encoded CRC for the at least one data group, and comprising:

a CRC generator configured to generate for the at least one data group an expected CRC that is a function of the at least one data group, not including the at least one error status bit; and a comparator configured to compare the encoded CRC to the expected CRC and to at least one specially designated CRC to thereby provide indication of whether a transmission error is present in the at least one data group and encoded CRC and whether the data block contains corrupt data.

24. The networked system of claim 23, wherein the encoding module comprises:

a CRC generator configured to receive the data block and the control/status bits for the at least one data group, not including the at least one error status bit, and configured to provide the expected CRC; and an encoding module configured to receive from the CRC generator the expected CRC and to receive the at least one error status bit, and configured to generate the encoded CRC for the at least one data group.

25. The networked system of claim 24, wherein the encoded CRC is equal to the expected CRC when the state of the at least one error status bit is indicative of the absence of the at least one type of data block error.

26. The networked system of claim 24, wherein the expected CRC comprises M bits in M bit positions with each bit having a state, and wherein the encoding module reverses the state of a predetermined plurality of the M bits in a predetermined plurality of the M bit positions to generate the encoded CRC.

27. The networked system of claim 26, wherein the encoding module reverses the state of each bit of the expected CRC to generate the encoded CRC to thereby indicate a particular type of data block error.

28. The networked system of claim 26, wherein the encoding module reverses the state of every other bit of the expected CRC beginning with a first bit position to generate the encoded CRC to thereby indicate a particular type of data block error.

29. The networked system of claim 26, wherein the encoding module reverses the state of every other bit of the expected CRC beginning with a second bit position to generate the encoded CRC to thereby indicate a particular type of data block error.

30. The networked system of claim 23, the sending node further comprising:

a buffer configured to receive a series of source flits from a source node, with each source flit comprising one data group of the series of data groups and an associated source CRC having a plurality of bits, and configured to provide the series of data groups.

31. The networked system of claim 30, wherein the buffer comprises:
a register having a plurality of bit positions configured to receive the series of source flits, configured to segregate each source flit of the series into its corresponding data block data bits, source CRC bits, at least one error status bit, and into control/status bits not including the at least one error status bit, and configured to provide the data block, the at least one error status bit, and the control/status bit not including the at least one error status bit, of the at least one data group.

32. The networked system of claim 23, the sending node further comprising:
an output module configured to receive the at least one data group, not including the at least one error status bit, and configured to receive the encoded CRC for the at least one data group to thereby provide a transmission flit comprising the at least one data group, not including the at least one error status bit, and the encoded CRC for the at least one data group.

33. The sending node of claim 32, the sending node further comprising:
a verification module configured to receive the transmission flit and the at least one error status bit for the at least one data group, configured to provide the transmission flit, and to provide a verification flit when the state of the at least one error status indicates a presence of the at least one type of data block error.

34. The networked system of claim 33, wherein the verification module comprises:
an error circuit configured to receive the at least one error status bit of the at least one data group, and configured to provide the verification flit, and to provide a selector signal indicative of the state of the at least one error status bit; and
a multiplexer configured to receive the transmission flit, the verification flit, and the selector signal, configured to provide the transmission flit, and to provide the verification flit when the selector signal indicates that the state of the at least one error status indicates a presence of the at least one type of data block error.

35. The networked system of claim 23, wherein the comparator reverses the state of a predetermined plurality of the M bits in a predetermined plurality of the M bit positions of the expected CRC to thereby provide the at least one specially designated CRC.

36. The networked system of claim 23, wherein the comparator further provides an error signal indicative of whether the expected CRC matches the encoded CRC for the at least one transmission flit and provides an encoding signal indicative of whether the encoded CRC for the at least one transmission flit matches the at least one specially designated CRC.

37. The networked system of claim 36, the receiving node further comprising:
an output module configured to receive the at least one transmission flit, the error signal, and the encoding signal, and configured to provide in a first response the at least one transmission flit when the error signal indicates that the expected CRC matches the encoded CRC for the at least one transmission flit, to provide in a second response the at least one transmission flit when the error signal indicates that the expected CRC does not match the encoded CRC and the encoding signal indicates that the encoded CRC matches the at least one specially designated CRC, and to provide in a third response an idle flit and a retransmit signal when the error signal indicates that the expected CRC does not match the encoded CRC and the encoding signal indicates that the encoded CRC does not match the at least one specially designated CRC.

38. The networked system of claim 37, wherein the output module is further configured to receive a validation flit indicative of whether the encoded CRC for the at least one transmission flit intentionally matches the at least one specially designated CRC, and the second response is to first provide an idle flit when the error signal indicates the expected CRC does not match the encoded CRC and to then provide the at least one transmission flit when the encoding signal indicates the encoded CRC matches the at least one designated CRC and the validation flit indicates that the encoded CRC intentionally matches the at least one designated CRC, and the third response is to first provide an idle flit when the error signal indicates the expected CRC does not match the encoded CRC and to then provide the retransmit signal when the encoding signal indicates the encoded CRC does not match the at least one specially designated CRC or the validation flit is either not received or indicates the encoded CRC does not intentionally match the at least one specially designated CRC.

39. The networked system of claim 38, wherein the output module comprises:
a validation module coupled to the decoder and configured to receive the encoding signal of the at least one transmission flit and the validation flit, and configured to provide a validation signal indicative of whether the encoded CRC of the at least one transmission flit intentionally matches the at least one designated CRC;
a retransmit module coupled to the decoder and to the validation module and configured to receive the validation signal and to receive the error signal for the at least one transmission flit, and configured to provide the retransmit signal and an output control signal; and
a transmitter coupled to the decoder and to the retransmit module and configured to receive the at least one transmission flit and the output control signal, and configured to provide the at least one transmission flit or the idle flit depending on a state of the output control signal.

40. The networked system of claim 39, wherein the validation block comprises:
a register coupled to the comparator and configured to receive the encoding signal for a subsequent transmission flit of the series of transmission flits and to provide the encoding signal for the at least one transmission flit; and
a verification block coupled to the first register and configured to receive the validation flit and the encoding signal for the at least one transmission flit, and configured to provide the validation signal having a first state when the encoding signal indicates the encoded CRC of the at least one transmission flit matches the at least one specially designated CRC and the validation flit indicates the match was intentional, and to provide the validation signal having a second state when the encoding signal indicates the encoded CRC of the at least one transmission flit does not match the at least one specially designated CRC or the validation flit indicates the encoded CRC of at least one transmission flit was not intended to match the at least one specially designated CRC.

41. The networked system of claim 39, wherein the retransmit block comprises:
 a register coupled to the comparator and receiving the error signal for a transmission flit subsequent to the at least one transmission flit and providing the error signal for the at least one transmission flit; and
 a retransmit block coupled to the comparator, the register, and to the validation block, and configured to receive the error signal for the at least one transmission flit, to receive the error signal for the subsequent transmission flit, and to receive the validation signal, and configured to provide the output select signal and the retransmit signal.

42. The networked system of claim 39, wherein the transmitter comprises:
 a register coupled to the decoder and configured and receiving the subsequent transmission flit of the series of transmission flits and providing the at least one transmission flit of the series; and
 a multiplexer having a first input coupled to the register and receiving the at least one transmission flit, a second input coupled to the decoder and receiving a subsequent transmission flit of the series, a third input receiving an idle flit, a selector input coupled to the retransmit block and receiving the output select signal; and configured to provide at an output the first, second, or third input depending on a state of the output select signal.

43. A method of communicating data, the method comprising:
 generating an expected cyclic redundancy code (CRC) for at least one data group of a series of data groups, wherein each data group comprises a data block and control/status bits including at least one error status bit having a state indicative of a presence or absence of at least one type of data block error, and wherein the expected CRC is a function of the data group and control/status bits not including the at least one error status bit; and
 encoding the expected CRC with the state of the at least one error status bit to generate an encoded CRC.

44. The method of communicating data of claim 43, the method further comprising:
 providing a verification flit indicative of whether the encoded CRC is encoded with the state of the at least one error status bit.

* * * * *